(12) United States Patent
Maghoul et al.

(10) Patent No.: US 7,966,341 B2
(45) Date of Patent: Jun. 21, 2011

(54) ESTIMATING THE DATE RELEVANCE OF A QUERY FROM QUERY LOGS

(75) Inventors: Farzin Maghoul, Hayward, CA (US); Kostas Tsioutsiouliklis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 309 days.

(21) Appl. No.: 11/834,616

(22) Filed: Aug. 6, 2007

(65) Prior Publication Data

US 2009/0043748 A1 Feb. 12, 2009

(51) Int. Cl.
*G06F 7/00* (2006.01)
*G06F 17/30* (2006.01)

(52) U.S. Cl. ...................................................... 707/768
(58) Field of Classification Search .................. 707/1, 3, 707/5, 705, 758, 759, 765, 768, 999.001, 707/999.002, 999.003, 999.005
See application file for complete search history.

(56) References Cited

U.S. PATENT DOCUMENTS

| | | | | |
|---|---|---|---|---|
| 5,963,940 | A * | 10/1999 | Liddy et al. ........................... 1/1 |
| 7,296,232 | B1 * | 11/2007 | Burdick et al. ................ 715/738 |
| 7,685,099 | B2 * | 3/2010 | Liu et al. ............................ 706/8 |
| 7,685,100 | B2 * | 3/2010 | Liu et al. ............................ 706/8 |
| 7,689,622 | B2 * | 3/2010 | Liu et al. ........................ 707/751 |
| 7,693,823 | B2 * | 4/2010 | Liu et al. ............................ 706/8 |
| 7,840,538 | B2 * | 11/2010 | Joshi et al. ..................... 707/672 |
| 2003/0144994 | A1 | 7/2003 | Wen et al. |
| 2005/0071741 | A1 * | 3/2005 | Acharya et al. ................ 715/500 |
| 2005/0102259 | A1 * | 5/2005 | Kapur ................................. 707/1 |
| 2005/0203878 | A1 * | 9/2005 | Brill et al. .......................... 707/3 |
| 2006/0053000 | A1 * | 3/2006 | Moldovan et al. ................. 704/9 |
| 2007/0150466 | A1 | 6/2007 | Brave et al. |
| 2008/0082578 | A1 * | 4/2008 | Hogue et al. ................ 707/104.1 |
| 2008/0306908 | A1 * | 12/2008 | Agrawal et al. .................... 707/3 |

OTHER PUBLICATIONS

Silverstein, Craig et al., "Analysis of a Very Large AltaVista Query Log" Oct. 1998, Digital Equiptment Corporation <http://citeseerx.ist.psu.edu/viewdoc/download;jsessionid=1C9421A91B076A2389FCEA7A3AF2DA7E?doi=10.1.1.54.241&rep=rep1&type=pdf>, p. 0-17.*
Kapur, S. et al., "Systems and Methods for Search Processing Using Clustering of Units" provisional application filed Oct. 9, 2003, USPTO, pp. 1-19.
Beitzel, S. et al., "Hourly Analysis of a Very Large Topically Categorized Web Query Log" Jul. 2004, ACM (SIGIR '04), pp. 1-8.

* cited by examiner

*Primary Examiner* — Brent Stace
(74) *Attorney, Agent, or Firm* — Hickman Palermo Truong & Becker LLP

(57) ABSTRACT

Techniques are provided maintaining data that indicates for a plurality of query terms whether the plurality of query terms are date-qualified query terms. A query is received, and in response to receiving the query, the query is inspected to determine that the query contains a particular date-qualified query term. Then it is determined that the particular date-qualified query term has been associated with a plurality of dates, and it is determined which of the plurality of dates with which to associate the date-qualified query term for the query, based at least in part on the frequency with which each particular date of the plurality of dates has been associated with the particular date-qualified query term.

28 Claims, 6 Drawing Sheets

ESTIMATING THE DATE RELEVANCE OF A QUERY FROM QUERY LOGS

RELATED APPLICATION DATA

This application is related to co-pending U.S. patent application Ser. No. 11/834,619, entitled "Extracting Query Intent from Query Logs," filed Aug. 6, 2007, the entire disclosure of which is incorporated by reference as if fully set forth herein.

FIELD OF THE INVENTION

The present invention relates to searching and, more specifically, to processing time-sensitive queries that do not explicitly identify dates.

BACKGROUND

As the amount of content, such as documents, images, videos and sound files, proliferates on the Internet, users have begun to rely more heavily on Internet search engines to locate and view content in which they are interested. One example of a search engine is a computer program designed to find documents stored in a computer system, such as the World Wide Web. The search engine's tasks typically include finding documents, analyzing documents, and building an index that supports efficient document retrieval.

A user describes the documents she is seeking with a query. In a common case, a query is a set of words, which should appear in the documents. Internet search engines offer the capability to search for links to content on the Internet that is deemed relevant to a search query, such as web pages and multimedia, among other categories. In response to a query, the web site performing the search query may display content extracted from other web sites in addition to links to content.

Query logs are a collection of user-submitted queries over a period of time. The collection may be supplemented by additional data, such as cookies, search results, click-through data, and other data. Each document returned by the search engine in response to the user's query is a result. A search results page is a web page that displays the result documents' web addresses along with titles, summaries, thumbnail images, and/or other information. A document's rank for a given query is the position in which the document appears on the search results page. A document's rank indicates that the search engine evaluated it more relevant to the user's query than lower-ranked documents.

One problem faced by search engines and their users is that certain queries have an unstated, inherent context that influences what set of results are the best; for example, the best results for particular queries may have a date component that is not present in the query. An example is: in November 2006, a user searches for the query "Olympics." The best and most relevant results depend on what year Olympics the user is looking for. Is the user looking for the 2004 Summer Olympics in Athens, the 2006 Winter Olympics in Turin, the 2008 Summer Olympics in China, or some other Olympics? These may be considered "time-sensitive" queries, which are queries with an implicit time component. Often, time-sensitive queries state a date explicitly, but that is not always the case. In the above example, "Olympics" is a time-sensitive query, but the date is assumed implicitly.

The search engine faces two problems when attempting to deal with queries with implicit context, such as a time-sensitive query. First, the search engine needs to identify which queries have this context, such as an implicit date component. Second, the search engine must identify which documents best relate to the query and respond to the query's implicit context.

Current approaches to identifying and responding to these particular queries are to take the text in a user's query, match that text to a property of a document indexed by the search engine, rank the results based upon various criteria such as number of times the search term appears in the document, how many other web pages link to the document returned in response to the query, or to rank the results procured by date of creation or modification of the particular web page result.

These approaches are inadequate for several reasons. The approaches do not offer a technique for identifying particular queries that may have an implicit context; for example, a query without a date where a date may be implied. Further, the approaches for ranking documents, such as sorting by date of creation or modification, do not specifically address the situation where the most relevant document may not be the most recently added or modified document.

Therefore, an approach for identifying searches with an implicit context and returning and ranking results in response to such queries, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for identifying a date to be associated with a particular search query where the query does not specify a date.

According to an embodiment, data is maintained that indicates for a plurality of query terms whether the plurality of query terms are date-qualified query terms. A query is received, and in response to receiving the query, the query is inspected to determine that the query contains a particular date-qualified query term. Then it is determined that the particular date-qualified query term has been associated with a plurality of dates, and it is determined which of the plurality of dates with which to associate the date-qualified query term for the query, based at least in part on the frequency with which each particular date of the plurality of dates has been associated with the particular date-qualified query term.

Architectural Overview

Figure 1:
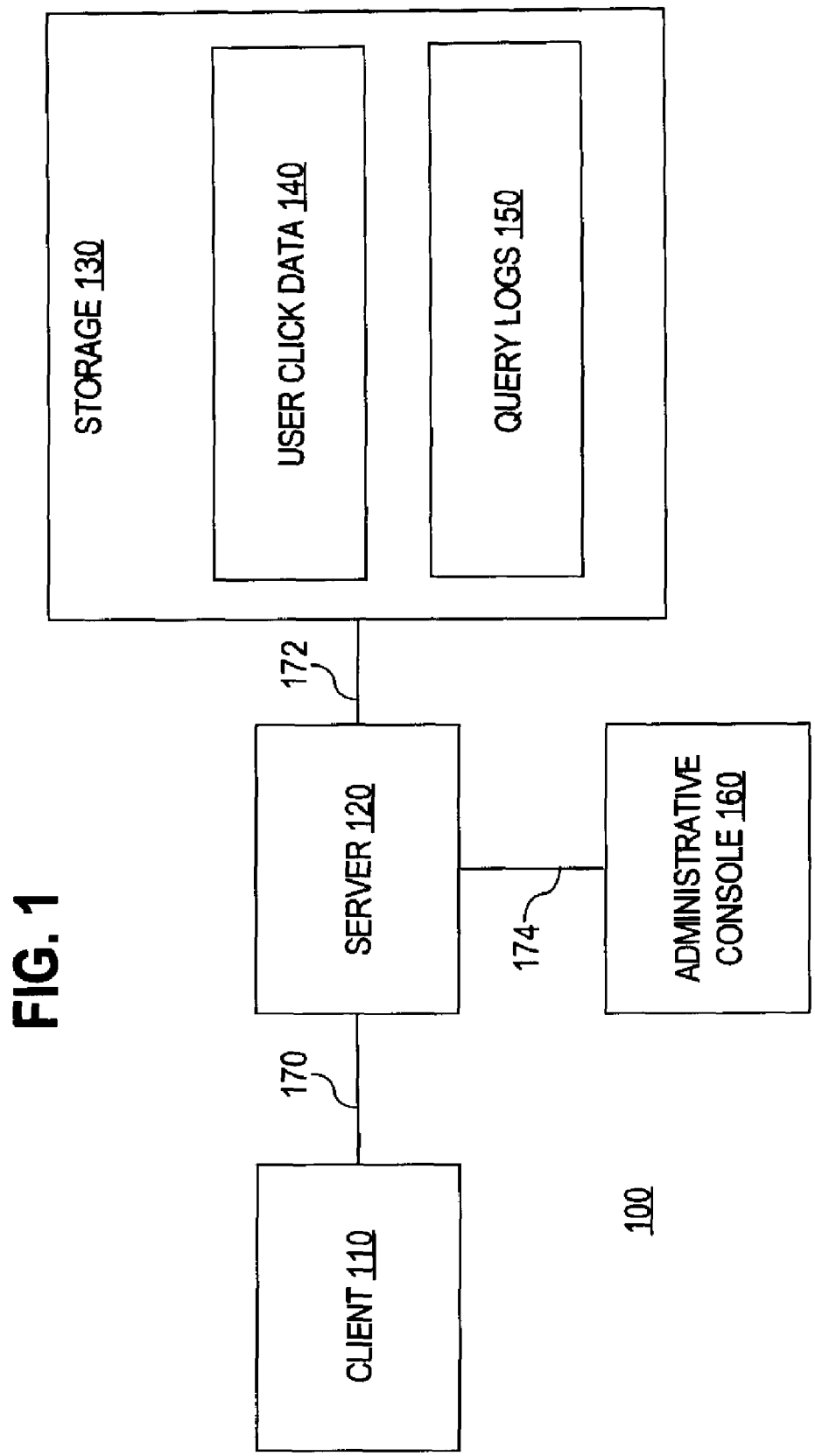
FIG. 1 is a block diagram of a system according to an embodiment of the invention.

FIG. 1 is a block diagram of a system 100 according to an embodiment of the invention. Embodiments of system 100 may be used to identify potentially offensive content in accordance with an embodiment of the invention.

In the embodiment depicted in FIG. 1, system 100 includes client 110, server 120, storage 130, user click data 140, query logs 150, and an administrative console 160. While client 110, server 120, storage 130, and administrative console 160 are each depicted in FIG. 1 as separate entities, in other embodiments of the invention, two or more of client 110, server 120, storage 130, and administrative console 160 may be implemented on the same computer system. Also, other embodiments of the invention (not depicted in FIG. 1), may lack one or more components depicted in FIG. 1, e.g., certain embodiments may not have a administrative console 160, may lack query logs 150, or may combine one or more of the user click data 140 and query logs 150 into a single index or file.

Although embodiments of the invention are depicted in the figures and described herein in the context of having a client 110, server 120, storage 130, user click data 140, query logs 150, and an administrative console 160, the functionality of these elements may be combined into a single element or implemented in any number of separate elements. Furthermore, the functionality of the client 110, server 120, storage 130, user click data 140, query logs 150, and an administrative console 160 may be implemented in hardware, software, or any combination of hardware and software, depending upon a particular implementation.

Client 110 may be implemented by any medium or mechanism that provides for sending request data, over communications link 170, to server 120. Request data specifies a search query that may contain terms about which the user desires to find content on the Internet.

The server, after processing the request data, will transmit to client 110 response data that returns content identified as relevant for a particular query. While only one client 110 is depicted in FIG. 1, other embodiments may employ two or more clients 110, each operationally connected to server 120 via communications link 170, in system 100. Non-limiting, illustrative examples of client 110 include a web browser, a wireless device, a cell phone, a personal computer, a personal digital assistant (PDA), and a software application.

Server 120 may be implemented by any medium or mechanism that provides for receiving request data from client 110, processing the request data, and transmitting response data that identifies the content identified as relevant for a particular query to client 110.

Storage 130 may be implemented by any medium or mechanism that provides for storing data. Non-limiting, illustrative examples of storage 130 include volatile memory, non-volatile memory, a database, a database management system (DBMS), a file server, flash memory, and a hard disk drive (HDD). In the embodiment depicted in FIG. 1, storage 130 stores the user click data 140 and query logs 150. In other embodiments (not depicted in FIG. 1), the user click data 140 and query logs 150 may be stored across two or more separate locations, such as two or more storages 130.

User click data 140 represents data recording each time a user clicks on content returned in response to a search. According to an embodiment, this is a user click log and is accomplished by recording the click and associating the click with the unique identifier associated with the item clicked upon, as described further herein. For example, if a search returns a link to a web page and an image, and the user clicks on the image, the user click data 140 will record that the particular image was clicked. If the user then returns to the search results and clicks the link to a web page, the user click data 140 will record that the particular link was clicked. Query logs 150 comprise a collection of user-submitted queries over a period of time. According to an embodiment, the query logs 150 are indexed to provide faster retrieval.

Administrative console 160 may be implemented by any medium or mechanism for performing administrative activities in system 100. For example, in an embodiment, administrative console 160 presents an interface to an administrator, which the administrator may use to add to, remove or modify data in the user click data 140, add to, remove or modify content from the query logs 150, or create an index on storage 130, or configure the operation of server 120.

Communications link 170 may be implemented by any medium or mechanism that provides for the exchange of data between client 110 and server 120. Communications link 172 may be implemented by any medium or mechanism that provides for the exchange of data between server 120 and storage 130. Communications link 174 may be implemented by any medium or mechanism that provides for the exchange of data between administrative console 160, server 120, and storage 130. Examples of communications links 170, 172, and 174 include, without limitation, a network such as a Local Area Network (LAN), Wide Area Network (WAN), Ethernet or the Internet, or one or more terrestrial, satellite or wireless links Extracting and Identifying Date-Qualified Queries Using Query Logs A time-sensitive query has different search results being most relevant, depending on the time the query is issued. For example, the query "spiderman movie" is time sensitive, in that the search results that are most relevant depend on the release of the newest Spiderman movie. A date-qualified query is a subset of time-sensitive queries. Specifically, a date-qualified query is a query that often comes with a date next to it. For example, "olympics" is a time-sensitive date-qualified query, because queries such as "olympics 2004" and "olympics 2008" are common in the query logs.

The approaches described herein identify date-qualified queries through a variety of approaches. In one embodiment, data containing queries, such as query logs or a live stream of queries, is collected and analyzed to determine which query terms are date-qualified. When future queries are received containing these date-qualified query terms, the results may be ranked accordingly, as described further herein.

As an example, let "Olympics" be a query from the query logs. The query logs are analyzed and the following queries are found: "Olympics 2004," "2006 Olympics," and "2008 Olympics." Since "Olympics" next to a date exists in the query logs, it may be determined that "Olympics" is a date-qualified query. The queries "Olympics 2004," "2006 Olympics," and "2008 Olympics" may also be considered date-qualified.

Figure 2:
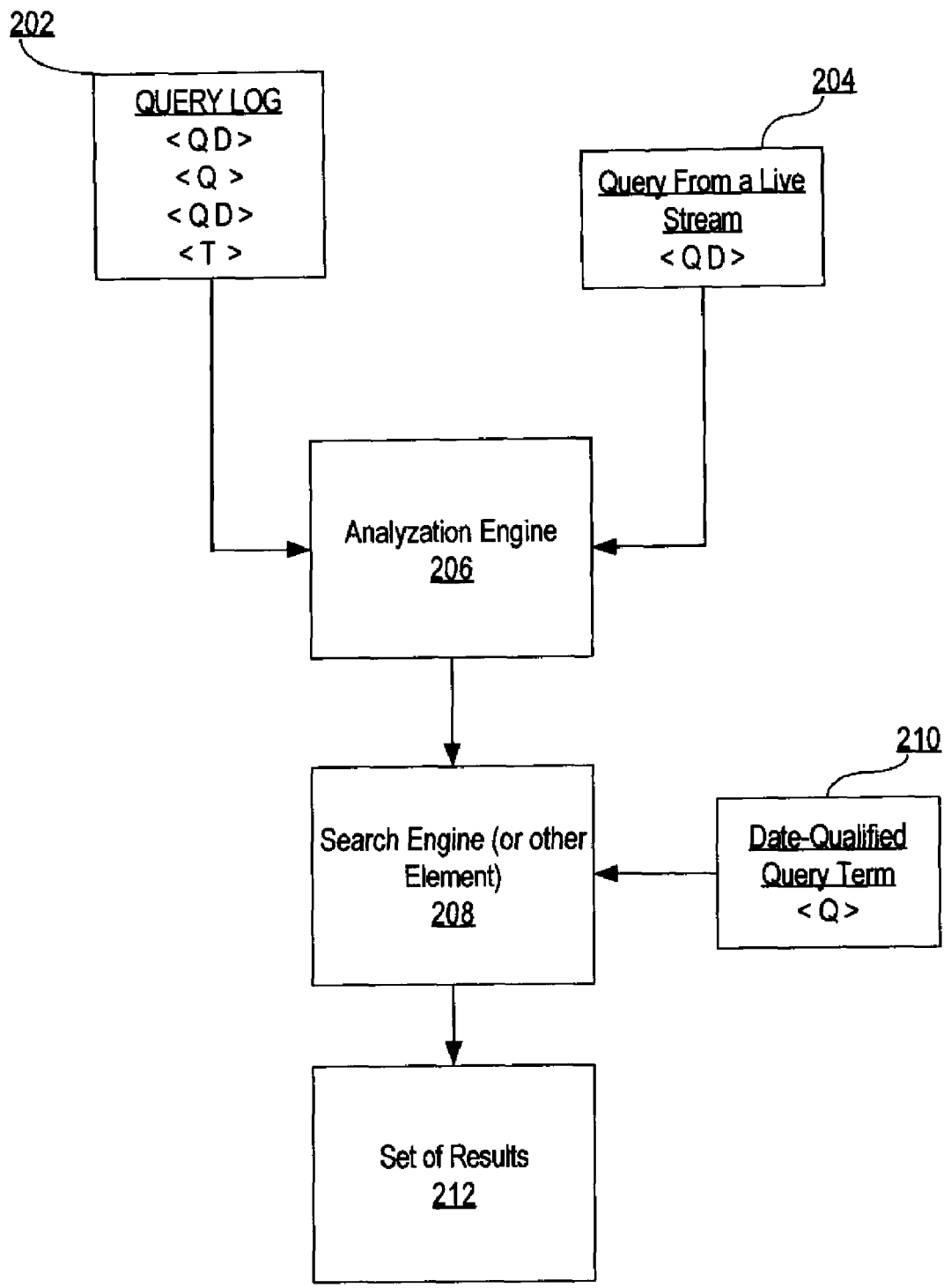
FIG. 2 is a block diagram illustrating an example flow and analysis of data according to an embodiment of the invention.

FIG. 2 is a block diagram illustrating an example flow and analyzation of data according to an embodiment of the invention. Although embodiments of the invention are depicted in the figures and described herein in the context of having a query log 202, one or more queries from a live stream 204, an analyzation engine 206, another element 208 such as a search engine, and a set of results 212, the functionality of these elements may be combined into a single element or implemented in any number of separate elements. Furthermore, the functionality of the query log 202, one or more queries from a live stream 204, an analyzation engine 206, another element 208 such as a search engine, and a set of results 212 may be implemented in hardware, software, or any combination of hardware and software, depending upon a particular implementation In FIG. 2, query data is collected and transmitted in order to analyze the query data. The query data may be in the form of a query log 202, for example in a database, or one or more queries from a live stream 204 being submitted by users. The query logs may be specific; for example, only queries from the last month. In the example embodiment, <Q> is a query in the query logs, such as "Olympics." If <Q D> is located in the query logs, where <D> is a date, then <Q> and <Q D> may be designated as date-qualified. The set of all date-qualified queries is the time-sensitive queries produced by the approaches described herein.

According to an embodiment, the term <Q> may be a single term or multiple terms. It may be normalized, such as reformulating the term in all lowercase or uppercase, removing white space, correcting spelling, and/or other actions. When the term or terms are normalized, both or either the original and normalized version may be designated as date-qualified.

A date <D> can be a date in any form identified as such. It is not restricted to a year, a month/day/year, or any other "standard" representations of dates. In fact, the dates may simply be indicated by time-indicating words, such as "yesterday", "last year", etc. According to an embodiment, the identification of dates and/or time-indicating words is accomplished through pattern matching, where certain formats of dates are stored and components of queries are compared to the stored examples to determine whether the component is a date. Certain dates may be "false positives," which are dates or numbers incorrectly identified as dates that are not contextually related to the query. For example, the query "Space Odyssey 2001" would not indicate a time-sensitive query. According to an embodiment, the dates used to identify a date-qualified query may be subject to a specified range. For example, only dates within 5 years of the current date may be identified and used in the determination, while all other dates are discarded for purposes of identifying date-qualified queries.

In FIG. 2, the query data 202, 204 is transmitted to an analyzation engine 206, which in various embodiments may comprise a search engine or similar process executing on a computer. According to an embodiment, the queries, such as <Q> and <Q D> are received and analyzed. If a query term <Q> is associated with a date, for example being preceded or followed by a year, then the query term <Q> is a candidate for inclusion as a date-qualified query. In an embodiment, the query term <Q> is designated as date-qualified if there exists at least one query of the form <Q D> in the query data 202, 204. In alternate embodiments, a particular ratio or threshold is used to determine whether a query should be designated as a date-qualified query. A single instance of <Q D> may be an error, such as a misspelling, on a user's part. Because date-qualified queries should be time-sensitive, <Q> should not be underrepresented in the instances where it appears in proximity to a date.

A ratio may be used to calculate a threshold value, above which a query may be designated as date-qualified. For example, a threshold ratio might be one in 100, where <Q> appears N times in the query data 202, 204, then if <Q D> appears at least N/100 times, the query <Q> may be designated as date-qualified. Given that <D> may appear as multiple dates and representations, they may be considered cumulatively or individually. In an embodiment, different representations of <D> corresponding to the same date are merged.

Instead of a discrete threshold, the frequency with which <Q D> appears in the query data 202, 204 may be used to calculate a score by which the query term <Q> may be evaluated. The score may be continuously updated and smoothed to account for outliers and skewed numbers. For example, the threshold may be adjusted based on an analysis of recent queries. In an embodiment, if it is determined that a particular ratio tends to indicate a date-qualified query, then the ratio data could be used as one part of a larger approach to determine date-qualified queries.

False positives, such as "Space Odyssey" mentioned in the example given above, can be reduced by requiring date qualified queries to appear in the query logs together with more than one year. For example, "olympics" can be found next to "2004", "2008", etc. Queries that have only a single year (or date qualifier) attached to them are likely not time-sensitive.

Other types of data may be used to designate a query as date-qualified. For example, session data, which is data comprised of queries from a single user during a single search session, may indicate a likelihood of a date-qualified query. A user may submit a search query of "Olympics," and then a search query of "Olympics 2004." This progression of search terms may indicate that there is an implicit date element to the query term "Olympics." User click logs may also be used to designate a query as date-qualified. For example, if at least a particular ratio of users who submitted a query of "Olympics" were identified as clicking on a result that could be classified as being a date-sensitive document, such as the site for the 2008 Olympics, then this information could be used to determine whether a particular query term should be designated as date-qualified. Another generalization is to define date-qualified queries, not only based on explicit date, but also on time-indicating words, such as "yesterday", "last year", etc.

Once the analyzation engine 206 determines that a particular query term <Q> is a date-qualified query, that information may be communicated to another element 208, for example a search engine. In an embodiment, elements 206 and 208 may be combined. Search engine 208 then receives a query 210 that contains the date-qualified query term <Q>, for example alone or in combination with a date, and the search engine provides a set of results 212 ranked according to the techniques described further herein.

Figure 3:
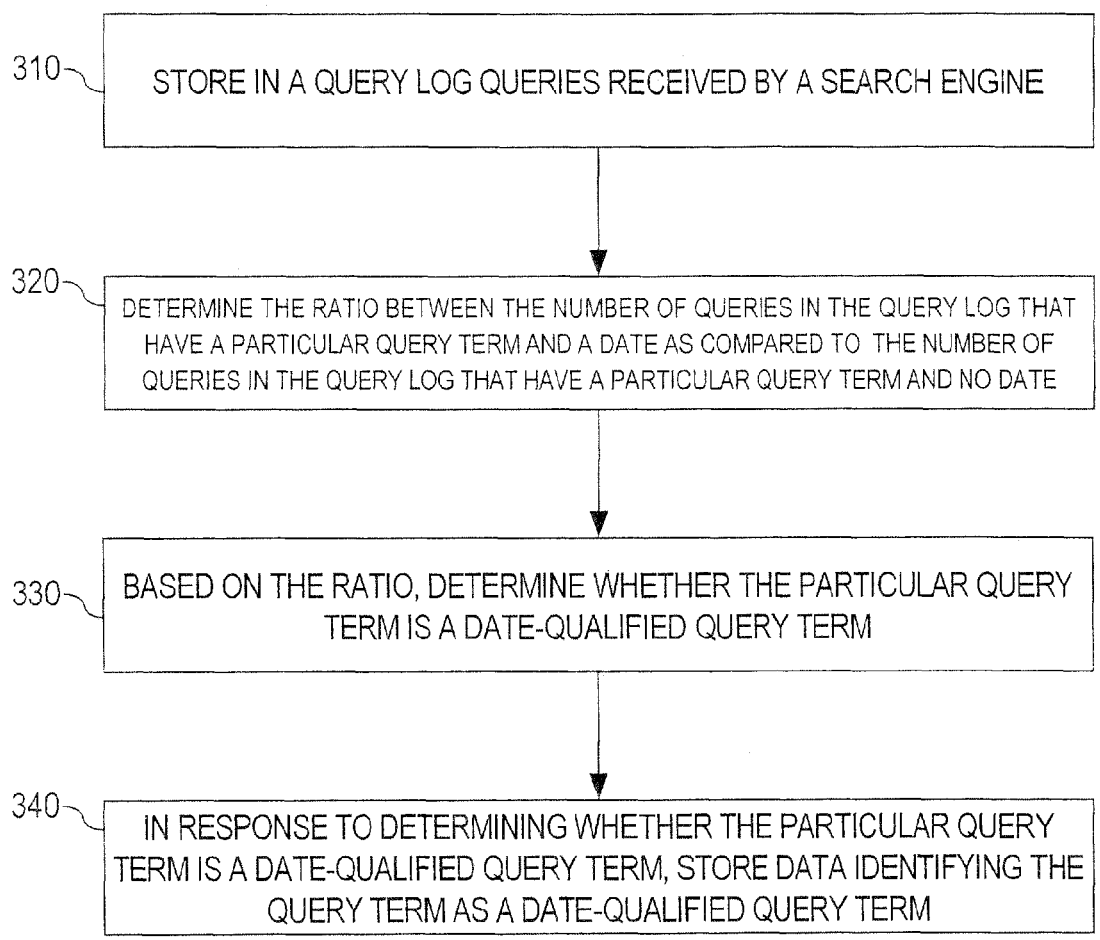
FIG. 3 is a flowchart illustrating the functional steps of identifying and designating queries as date-qualified, according to an embodiment of the invention.

FIG. 3 is a flowchart illustrating the functional steps of identifying and designating queries as date-qualified, according to an embodiment of the invention. In step 310, queries received by a search engine are stored in a query log. The storage may be random-access memory storage or durable storage such as a hard drive. The query logs may consist of queries received in the past, or may be a continuously updating storage of queries. In step 320, for a particular query term, it is determined how many queries in the query log contain that particular query term and a date, and how many queries in the query log contain that particular query term without a date. It may also be determined how many total queries exist with the query term included.

In step 330, a ratio is calculated, and based on the ratio between the number of queries in the query log that contain the particular query term and a date and the number of queries in the query log that contain the particular query term without a date, it is determined whether the particular query term is a date-qualified query term. The ratio may also be between the number of queries in the query log that contain the particular query term and a date and the total number of queries in the query log that contain the particular query term. In an embodiment, the ratio is compared to a threshold value in order to determine whether the particular query term is a date-qualified query term.

In step 340, in response to determining that the particular query term is a date-qualified query term, data is stored in a computer-readable medium that identifies the query term as a date-qualified query term.

Estimating the Date Relevance of a Query And Generating Results Based on the Date Relevance Once a query is determined to be a date-qualified, then the results returned as a result of a user query incorporating these query terms may be modified based upon the determination of the most relevant date for the query.

As an example, in November 2006, a user searches for the query "Olympics." Assuming this query has been designated as a date-qualified query, the next step is to determine which date is the most relevant date. It could be, for example, the Athens 2004 Olympics, the Turin 2006 Winter Olympics, the Beijing 2008 Olympics, or some other Olympics. Another example is a user searching for "Honda Accord." Assuming that the query is a date-qualified query, the next step is to determine which model year is the most relevant result for the query.

According to an embodiment, one approach to determining a date relevance of a query <Q> is to analyze query logs for queries that contain <Q> and a date <D>. Among all such entries, extract the date of the most frequent date <D> associated with the query <Q D>. This date <D> becomes the implicit date of the original query <Q>. For example, for a date-qualified query "Olympics," after analyzing the query logs, it is determined that 150 instances of "2004 Olympics," 100 instances of "2006 Olympics," and 250 instances of "2008 Olympics" are present. Among these, the date "2008" has the highest frequency, and thus "2008" is designated as the implicit date for the date-qualified query "Olympics."

According to an embodiment, the probability distribution of dates <D> may be determined instead of simply the most frequent date. For example, in the above example, instead of designating "2008" as the implicit date for the query "Olympics," probabilities may be assigned to all date terms <D> according to their relative frequencies. In the above example, "2004" would be designated with probability 0.3, "2006" 0.2, and "2008" 0.5. Then, a date is picked uniformly among the relative frequencies each time the date-qualified query "Olympics" is received from a user.

According to an embodiment, another approach is to consider multiple dates. Because a search results page usually displays more than a single search result or search results associated with a single date, a specified percentage of the search results may correspond to the most common date <D>, another specified percentage may correspond to the next most common date <D>, and so forth. The number of search results corresponding to each date term <D> could be determined based on the probability distribution as described above.

Figure 4:
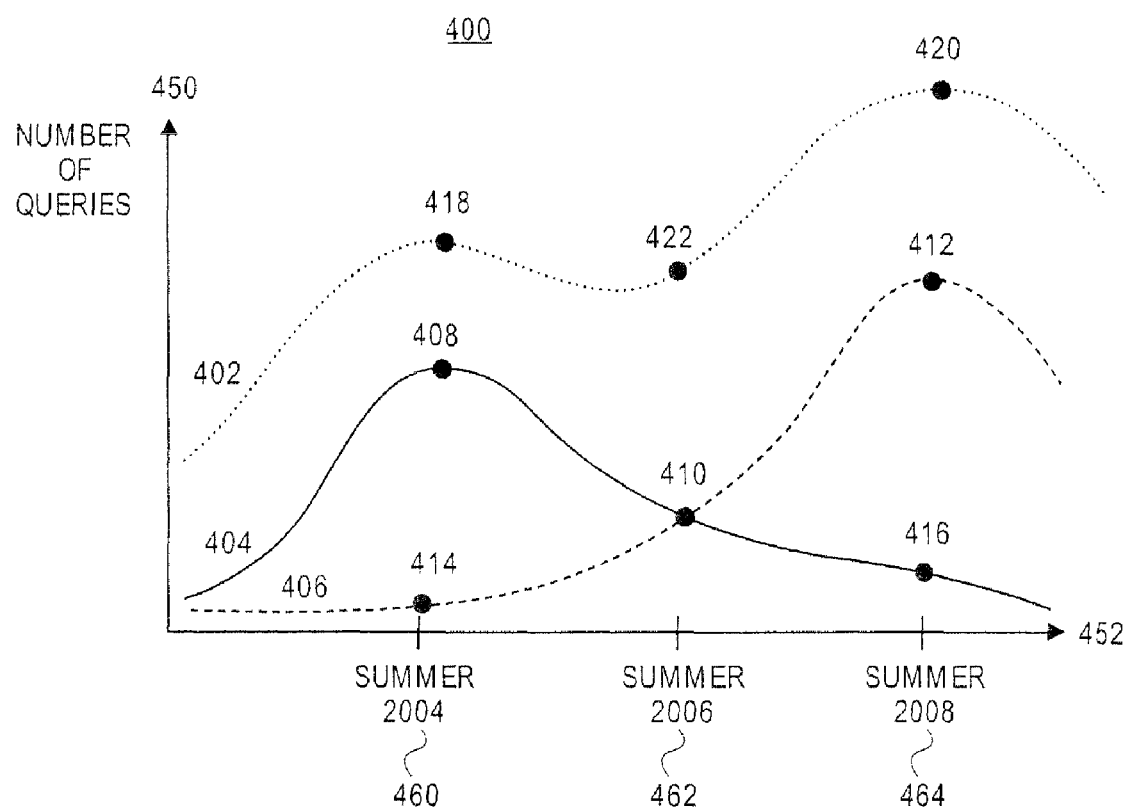
FIG. 4 is a block diagram illustrating an example frequency distribution of a query term over time, according to an embodiment of the invention.

FIG. 4 is a block diagram illustrating a graph 400 of an example frequency distribution of a query term over time, according to an embodiment of the invention. In FIG. 4, the vertical axis 450 represents a number of queries submitted to a search engine, as determined by examining query logs. The horizontal axis 452 represents time.

In the graph illustrated in FIG. 4, the lines 402, 404, 406, when plotted against the vertical axis 450, represent the number of queries comprising a variation on the term "Olympics," as discussed further herein, and the lines 402, 404, 406, when plotted against the horizontal axis 452, represent the date the queries were submitted.

The dotted line 402 in the graph 400 represents the total number of queries containing the word "Olympics." The solid line 404 in the graph 400 represents the total number of queries containing the word "Olympics" and the date 2004, which is a subset of the total number of queries containing the word "Olympics." The dashed line 406 in the graph 400 represents the total number of queries containing the word "Olympics" and the date 2008, which is a subset of the total number of queries containing the word "Olympics." As FIG. 4 illustrates, in the Summer of 2004 460, the number of queries 414 containing the word "Olympics" and the date 2008 were low compared to the number of queries 408 containing the word "Olympics" and the date 2004. Of the total number of queries 418 containing the word "Olympics" submitted in the Summer of 2004 460, the number of queries 408 containing the word "Olympics" and the date 2004 comprised a much higher percentage than the number of queries 414 containing the word "Olympics" and the date 2008.

In the Summer of 2006 462, the number of queries 410 containing the word "Olympics" and the date 2004 reached an equilibrium in terms of a percentage of total number of queries 422 containing the word "Olympics" with the total number of queries 410 containing the word "Olympics" and the date 2008. As the Summer of 2006 462 is halfway between the 2004 Summer Olympics and the 2008 Summer Olympics, this is expected. The total number of queries 422 containing the word "Olympics" is higher than the sum of all the queries containing the word "Olympics" and the dates 2004 or 2008, which may be because the 2006 Winter Olympics were being held in 2006.

In the Summer of 2008 464, the situation has reversed. The number of queries 412 containing the word "Olympics" and the date 2008 were higher compared to the number of queries 416 containing the word "Olympics" and the date 2004. Of the total number of queries 420 containing the word "Olympics" submitted in the Summer of 2008 464, the number of queries 412 containing the word "Olympics" and the date 2008 comprised a much higher percentage than the number of queries 416 containing the word "Olympics" and the date 2004. Also, the total number of queries 420 containing the word "Olympics" submitted in the Summer of 2008 464 is higher than the total number of queries 418 containing the word "Olympics" submitted in the Summer of 2004 460. This may be because the Olympics are more popular and therefore are generating a higher number of Internet queries.

According to an embodiment, smoothing techniques may be utilized to normalize data that is subject to anomalies and outliers. For example, a massively publicized event happening on a particular date may skew the frequency distribution. For example, a deadly tsunami in the year 2006 may result in a huge temporary number of searches for "Tsunami" and "2006." This large number of searches on that particular date may not accurately reflect the actual frequency distribution of searches for "Tsunami," so techniques may be applied to maintain an accurate probability distribution in spite of the surge in a particular query. Additional 'smoothing' functions can be applied to the probability distribution in order to reduce such spikes. The logarithmic function is an example. Another approach is to cap the function at a certain percentage.

Therefore, in the example illustrated in FIG. 4, assuming that the query term "Olympics" is a date-qualified query in the Summer of 2004 460, "2004" is designated as the implicit date for the date-qualified query "Olympics" because it is the most common date <D> for <Q>. In an embodiment, search results including the date-qualified query are filtered according to the implicit date assigned to the query term. For example, only results related to the implicit date assigned to the query would be displayed.

According to another embodiment, the same set of search results that would be returned if the term were not a date-qualified query are assembled, but a modifier is applied to the ranking of the results according to the frequencies of the explicit dates (the dates associated with the query term in the query logs that are used to determine which date should be designated the implicit date). That is, among all search results, apply a large upwards modifier to search results that relate to the most popular date; apply a smaller upwards modifier to search results that relate to the second most popular date, and so forth. For example, results related to the date "2004," such as news items with that date, or web pages with the text "2004 Summer Olympics" on them, or any other web pages determined to be associated with the year 2004, are displayed higher in the search results than web pages determined to be associated with the year 2008, which are displayed higher in the search results than web pages determined to be associated with the year 2012, and so forth.

According to another embodiment, search results for a date-qualified query are apportioned according to the relative frequency distribution of the explicit date components. As in the example previously discussed, where the explicit date term "2004" was designated with probability 0.3, "2006" with probability 0.2, and "2008" with probability 0.5, the number of search results related to each date components would reflect the relative frequencies 0.3, 0.2, and 0.5.

According to another embodiment, search results for a date-qualified query are apportioned randomly with no regard for the relative frequency distribution of explicit date components. In another embodiment, the relative frequency distribution of explicit date components is merely one of several factors that are considered by a classifier when determining an appropriate set of search results to return for a particular query. In some cases, the relative frequency distribution of explicit date components may be a large factor, while in other cases, it may be a small factor.

According to an embodiment, if a query has an explicit date component, then the query is not treated as a date-qualified query. In another embodiment, a query with an explicit date component may be treated as a date-qualified query, but the search results are not modified based upon the techniques described herein. One reason for this is that the query already indicates a particular date that the results should be relevant to. Modifying the search results based on an implicit date may detract from the accuracy of the search results.

According to an embodiment, a date used in the determination of the most relevant date for a query can be of any form identifiable as a date. Unless specified by a user, there is no explicit restriction to a year standing alone, a year/month/day format, or any other standard representation. The date may be at the front of a query, in the middle, or at the end. In an embodiment, different representations corresponding to the same date may be merged when calculating frequencies.

According to an embodiment, user click data may be used to determine which particular documents to return in response to a date-qualified query. For example, it may be determined that for every query containing the terms "Olympics" and "2008," the user submitting the query selected a particular document in response to being presented with the search results. This correlation may be used when determining which documents to return in response to a date-qualified query of "Olympics" when the implicit date associated with the query is 2008.

Figure 5:
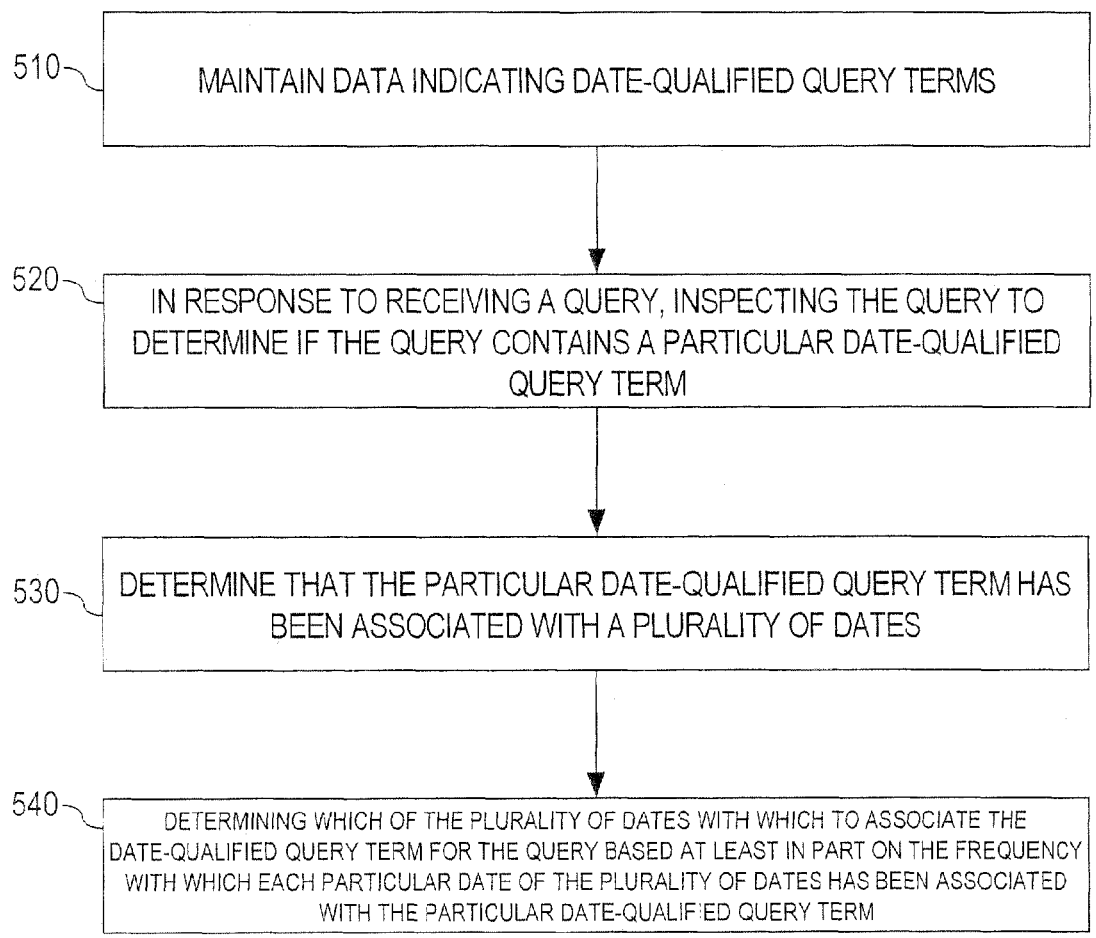
FIG. 5 is a flowchart illustrating the functional steps of estimating the date relevance of a query and generating results based on the date relevance, according to an embodiment of the invention.
Figure 6:
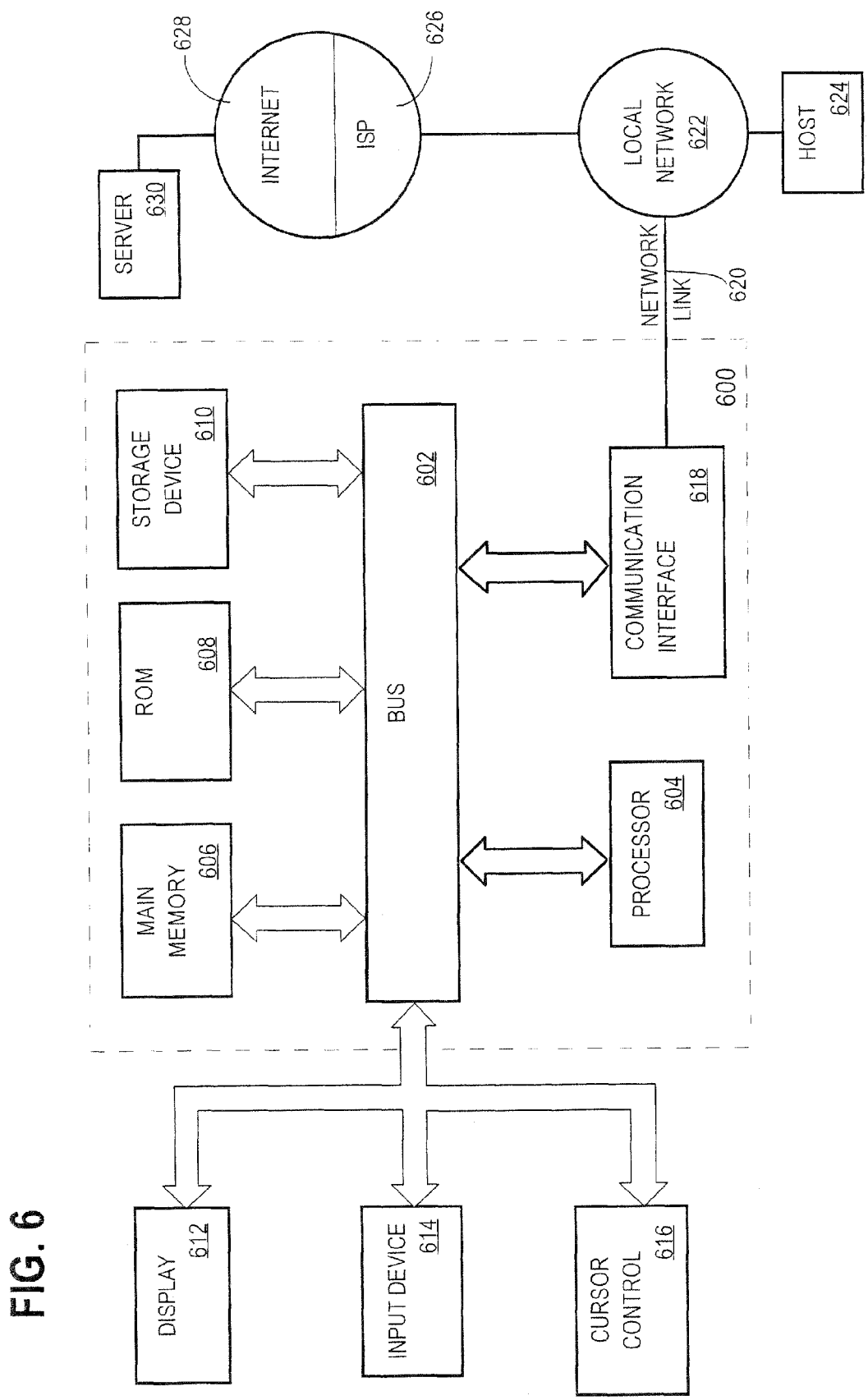
FIG. 6 is a block diagram of a computer system upon which embodiments of the invention may be implemented.

FIG. 5 is a flowchart illustrating the functional steps of estimating the date relevance of a query and generating results based on the date relevance, according to an embodiment of the invention. In step 510 of FIG. 5, data is maintained that indicates for a plurality of query terms whether the plurality of query terms are date-qualified query terms. In step 520, a query is received, and in response to receiving the query, the query is inspected to determine whether the query contains a particular date-qualified query term. In step 530, it is determined that the particular date-qualified query term has been associated with a plurality of dates. In step 540, it is determined which of the plurality of dates with which to associate the date-qualified query term for the query, based at least in part on the frequency with which each particular date of the plurality of dates has been associated with the particular date-qualified query term Implementing Mechanisms FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining dates for date-qualified query terms within search queries, the computer-implemented method comprising:
   maintaining data that indicates, for a plurality of query terms, whether the plurality of query terms are date-qualified query terms;
   receiving a query at a search engine;
   prior to returning results for the query, performing:
      in response to receiving the query, inspecting the query to determine that
         (a) the query contains a particular date-qualified query term, and
         (b) the query does not explicitly identify a time for the particular date-qualified query term; and
      for the query, determining at least one date that is not in the query with which to associate the date-qualified query term based, at least in part, on queries previously received by the search engine that include both (a) the date-qualified query term, and (b) a date;
      processing the query based, at least in part, on the at least one date that was not in the query;
      returning, based at least in part on the at least one date that was not in the query, results for the query;
   wherein the computer-implemented method is performed by one or more computing devices.

2. The method of claim 1 wherein the step of determining at least one date includes determining a frequency with which queries previously received by the search engine have associated the date-qualified query term with particular dates.

3. The method of claim 1, wherein the step of processing the query based, at least in part, on the at least one date that was not in the query comprises:
- determining results for the query; and
- ordering the results based, at least in part, on the at least one date.

4. The method of claim 1 wherein the at least one date is determined based, at least in part, on which date of a plurality of dates has been associated with the particular date-qualified query term a greatest number of times.

5. The method of claim 1, wherein the step of processing the query based, at least in part, on the at least one date that was not in the query comprises using said at least one date as a criterion for selecting which results to return for the query.

6. The method of claim 1, further comprising:
- receiving a second query that includes a second date-qualified query term;
- inspecting the second query to determine that the second query includes a date; and
- in response to determining that the second query includes a date, establishing the second query as not being a date-qualified query.

7. The method of claim 6 further comprising generating results for the second query without regard to dates contained in queries, which included the second date-qualified query term, that were previously received by the search engine.

8. The method of claim 1 wherein:
- determining at least one date includes determining a plurality of dates for the query; and
- the method further comprises processing the query based on the plurality of dates.

9. The method of claim 8 wherein processing the query based on the plurality of dates includes including, in search results for the query, items associated with each of the plurality of dates.

10. The method of claim 9 wherein:
- processing the query based on the plurality of dates includes ranking search results for the query based, at least in part, on scores generated for each of the plurality of dates; and
- the scores are based on content of said queries previously received by the search engine.

11. The method of claim 10 wherein the scores are based on a relative frequency that each of the plurality of dates was contained in queries that included the particular date-qualified query term.

12. A computer-implemented method for determining dates for date-qualified query terms within search queries, the computer-implemented method comprising:
- maintaining data that indicates, for a plurality of query terms, whether the plurality of query terms are date-qualified query terms;
- receiving a query;
- prior to returning results for the query, performing:
  - in response to receiving the query, inspecting the query to determine that
    - (a) the query contains a particular date-qualified query term, and
    - (b) the query does not explicitly identify a time for the particular date-qualified query term;
  - for the query, determining at least one date that is not in the query with which to associate the date-qualified query term based, at least in part, on a frequency with which each of the plurality of dates has occurred along with the particular date-qualified query term, in previously received queries;
- processing the query based, at least in part, on the at least one date that was not in the query;
- returning, based at least in part of the at least one date that was not in the query, results for the query;
- wherein the computer-implemented method is performed by one or more computing devices.

13. The method of claim 12 wherein the frequency with which dates has occurred along with the particular date-qualified term is determined based on entries of a query log of a search engine.

14. The method of claim 13 wherein:
- the query logs include:
  - a first set of entries that indicate queries that included the particular date-qualified query term and a particular date in a first format; and
  - a second set of entries that indicate queries that included the particular date-qualified query term and said particular date in a second format; and
- the first set of entries and the second set of entries are both counted towards said particular date when determining the frequency for said particular date.

15. A computer-readable storage storing one or more sequences of instructions which, when executed by one or more processors, causes the one or more processors to perform the method recited in claim 1.

16. A computer-readable storage storing one or more sequences of instructions which, when executed by one or more processors, causes the one or more processors to perform the method recited in claim 2.

17. A computer-readable storage storing one or more sequences of instructions which, when executed by one or more processors, causes the one or more processors to perform the method recited in claim 3.

18. A computer-readable storage storing one or more sequences of instructions which, when executed by one or more processors, causes the one or more processors to perform the method recited in claim 4.

19. A computer-readable storage storing one or more sequences of instructions which, when executed by one or more processors, causes the one or more processors to perform the method recited in claim 5.

20. A computer-readable storage storing one or more sequences of instructions which, when executed by one or more processors, causes the one or more processors to perform the method recited in claim 6.

21. A computer-readable storage storing one or more sequences of instructions which, when executed by one or more processors, causes the one or more processors to perform the method recited in claim 7.

22. A computer-readable storage storing one or more sequences of instructions which, when executed by one or more processors, causes the one or more processors to perform the method recited in claim 8.

23. A computer-readable storage storing one or more sequences of instructions which, when executed by one or more processors, causes the one or more processors to perform the method recited in claim 9.

24. A computer-readable storage storing one or more sequences of instructions which, when executed by one or more processors, causes the one or more processors to perform the method recited in claim 10.

25. A computer-readable storage storing one or more sequences of instructions which, when executed by one or more processors, causes the one or more processors to perform the method recited in claim 11.

26. A computer-readable storage storing one or more sequences of instructions which, when executed by one or more processors, causes the one or more processors to perform the method recited in claim 12.

27. A computer-readable storage storing one or more sequences of instructions which, when executed by one or more processors, causes the one or more processors to perform the method recited in claim 13.

28. A computer-readable storage storing one or more sequences of instructions which, when executed by one or more processors, causes the one or more processors to perform the method recited in claim 14.

* * * * *